May 6, 1930.                E. Z. COLE                1,757,924
                             NUT LOCK
                       Filed Sept. 17, 1928
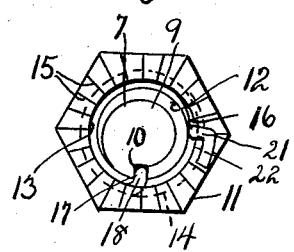
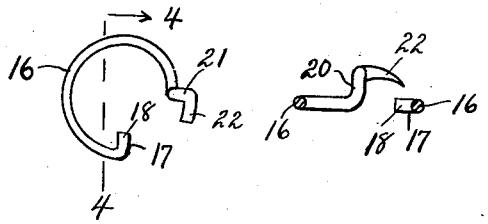
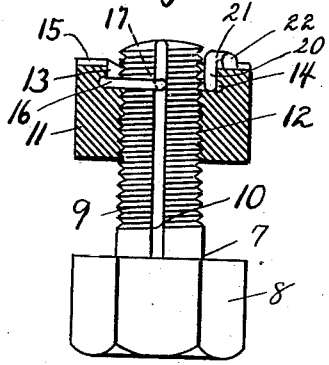
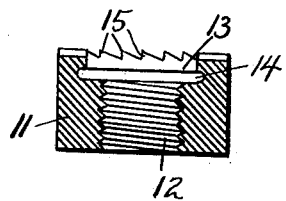
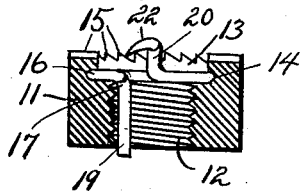
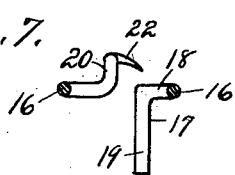
INVENTOR.
Elwyn Z. Cole
By W. W. Williamson
Atty Patented May 6, 1930

1,757,924

UNITED STATES PATENT OFFICE

ELWYN Z. COLE, OF PHILADELPHIA, PENNSYLVANIA

NUT LOCK

Application filed September 17, 1928. Serial No. 306,328.

My invention relates to new and useful improvements in a nut lock and has for one of its objects to improve the construction illustrated in my copending application, Serial No. 305,067, filed September 10, 1928.

Another object of the invention is to so construct a nut lock that the exterior of the nut will be substantially the same as the ordinary or standard nut and in which the locking device is practically concealed therein with the possible exception of the ratchet.

A further object of the invention is to construct a nut lock wherein the nut is provided with the usual threaded bore having a smooth counter bore at the outer end with a circular groove formed in the wall of the counter bore to receive the spring bow of a locking device having a holding leg for registration with a spline groove in a bolt and further provided with a ratchet for co-operation with teeth on the outer face of the nut.

A still further object of the invention is to provide a nut lock consisting of a longitudinally grooved bolt, a nut provided with ratchet teeth, and a locking element swiveled within the nut and splined to the bolt and having a ratchet for engagement with teeth on the outer face of the nut to permit the latter to be threaded on to the bolt while preventing retrograde movement thereof.

With these ends in view, this invention consists in the details of construction and combination of elements hereinafter set forth and then specifically designated by the claims.
In order that those skilled in the art to which this invention appertains may understand how to make and use the same, I will describe its construction in detail, referring by numerals to the accompanying drawings forming a part of this application, in which:—

Fig. 1, is an end view of a bolt with the nut thereon constructed in accordance with my improvement to provide a nut lock which will prevent retrograde movement of the nut.

Fig. 2, is a side elevation thereof with the nut shown in section.

Fig. 3, is a plan view of the locking member per se.

Fig. 4, is a section on the line 4—4 of Fig. 3 looking in the direction of the arrow.

Fig. 5, is a transverse section of the nut per se.

Fig. 6, is a similar view of a nut with a slightly modified form of locking member mounted therein.

Fig. 7, is a section similar to Fig. 4, of the modified locking member shown in Fig. 6.

In carrying out my invention as herein embodied, 7 represents a bolt of usual or any desirable construction including a head 8 and a threaded shank 9 in which a longitudinal spline groove 10 is formed.

On the bolt is mounted a nut 11 provided with the usual threaded bore 12 and having a smooth counter bore 13 at its outer end in the side wall of which formed an endless circular groove 14. On the outer face of the nut are formed any desirable number of ratchet teeth 15 of suitable configuration and they may be of a width equal to the distance between the side wall of the counter bore and the outer faces of the nut, or if found desirable, said teeth may terminate short of the outer faces of said nut.

Within the circular groove 14 in the nut is mounted the spring bow 16 of the locking member which may be fashioned from wire, flat metal or other suitable shaped material having an inherent resiliency. In addition to the spring bow, the locking member includes a holding leg 17 consisting merely of the inturned section 18, as shown in Figs. 3 and 4, or said leg may include an additional depending section 19, as shown in Figs. 6 and 7 but in the latter case, the section 19 must be of sufficient length to project slightly beyond the inner face of the nut, as plainly indicated in Fig. 6.

From the spring bow also projects an outwardly extending neck 20, Figs. 4 and 6, to a position beyond the ratchet teeth where said neck extends radially or laterally to form the ratchet head 21, Figs. 2 and 3, and from this head projects the ratchet nose 22 substantially at right angles to the head 21.

The locking member is installed in the nut by contracting the spring bow sufficiently to permit its insertion in the counter bore 13 until it coincides with the circular groove 14 when it will expand and prevent accidental displacement. In this position, the holding leg is projecting beyond the walls of the threaded bore and is therefore in the path of travel of the bolt and if said bolt is provided with fine threads, it will not force the locking member out of the circular groove 14 although in contact with the holding leg prior to the time when the spline groove 10 is brought into registration with the holding leg and thereafter the locking member will be prevented by the bolt from becoming displaced.

The neck 20 extends outward through the counter bore between its side wall and the bolt and the ratchet carried thereby overlies and engages the ratchet teeth 15 on the outer face of the nut.

The locking member being held against rotation by the holding leg and the ratchet being opposed to the reverse direction of travel of the nut, the latter is prevented from being backed off although it can be revolved in the proper direction for screwing it on to the bolt without interference since the ratchet teeth merely ride under the ratchet.

During the screwing of the nut on the bolt, the locking member will be moved longitudinally along said bolt because of its swiveled connection due to the spring bow lying within the groove 14 and therefore wherever the nut is stopped, it is locked and cannot be removed except by disengaging the ratchet from the teeth.

In some bolts, particularly those having coarse threads I have found that the longitudinal movement of the nut on the bolt is sometimes so great as to displace the locking member but the spline groove in the bolt registers with the holding leg and for this reason, I have found it advisable to provide the depending or inwardly extending section 19 so that the spline groove in the bolt may be brought into registration with the holding leg prior to said bolt being threaded in the nut.

While it is obvious to those skilled in this art that the locking member may be constructed in various ways for accomplishing the same purpose and want it distinctly understood that I do not limit myself to the particular arrangements and positions of the parts herein illustrated, as these have been made merely as an example of a practical method of accomplishing the results desired. In other words, while I have shown the holding leg and the ratchet at opposite ends of the spring bow, it is possible that both of these elements might be at one end or at a point intermediate the ends.

Having thus fully described my invention, what I claim as new and useful is:—

1. A nut lock including a bolt, a serrated nut provided with a threaded bore and a smooth counter bore at the outer end, the walls of said counter bore having a circular groove therein, a locking member including a spring bow fitted within the circular groove, a holding leg projecting into a longitudinal spline groove in the bolt, and a ratchet projecting from the spring bow outwardly through the counter bore and imposed on the serrations for coaction therewith to prevent retrograde action of the nut.

2. A nut lock including a bolt having a longitudinal spline groove, a nut having a threaded bore and a counter bore at its outer end, the walls of said counter bore having a circular groove therein, teeth on the outer face of the nut, and a locking member produced from suitable spring material and including a curved bowed portion for insertion in the circular groove, a holding leg projecting from one end of the bow for registration with the spline groove in the bolt, a neck projecting from the opposite end of the bow parallel with the bolt between the latter and the wall of the counter bore, a head extending laterally from the neck, and a ratchet nose projecting from the head for coaction with the teeth on the nut.

3. The structure set forth in claim 2 wherein the holding leg includes a section projecting radially from the bow and another section extending downwardly therefrom, the last mentioned section being of a length sufficient to cause its end to project beyond the inner face of a nut in which the locking member is used.

4. In combination with a splined bolt and counter-bored nut; the latter having ratchet teeth upon its outer face, the counter bore having an annular groove in its rear wall; a locking member comprising a curved spring bow for insertion in the groove of the nut, a holding leg for sliding engagement with the spline of the bolt, an up-turned neck for projecting beyond the face of the nut, and a ratchet carried by the neck for engagement with the teeth on the face of the nut.

In testimony whereof, I have hereunto affixed my signature.

ELWYN Z. COLE.